Nov. 15, 1960  F. D. ROBERTS  2,960,191
VEHICLE SKID BRAKES
Filed June 26, 1956  4 Sheets-Sheet 1
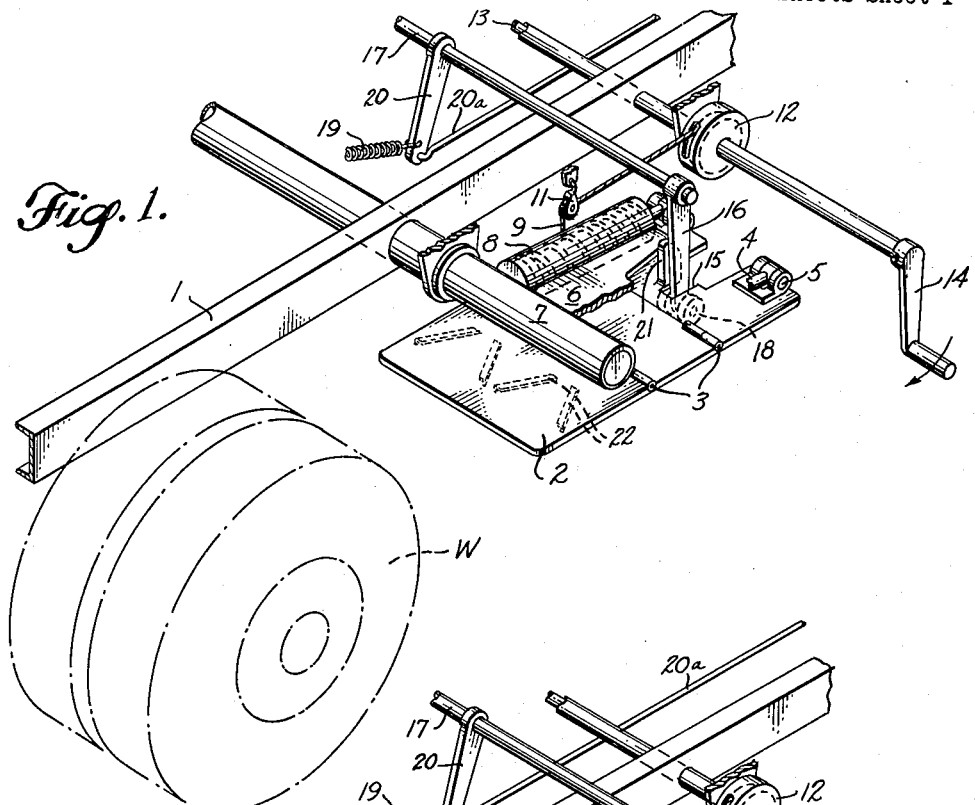
Fig. 1.
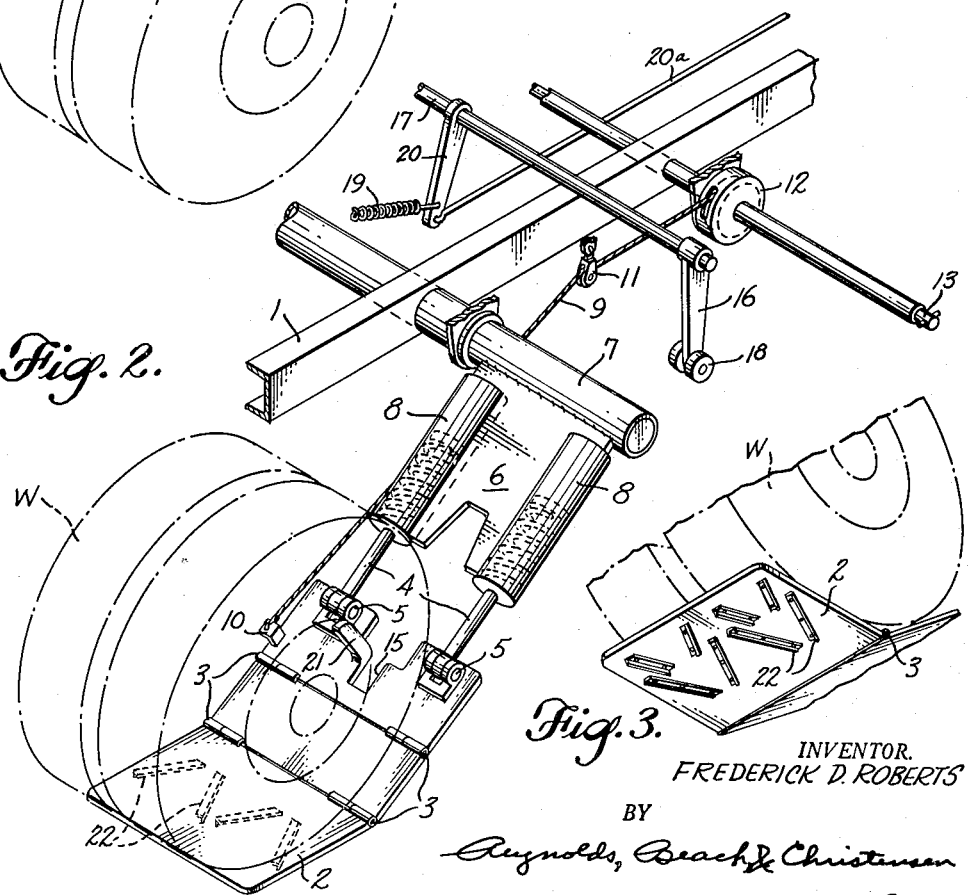
Fig. 2.
Fig. 3.
INVENTOR.
FREDERICK D. ROBERTS
BY
Reynolds, Beach & Christensen
ATTORNEYS

INVENTOR.
FREDERICK D. ROBERTS
ATTORNEYS

Nov. 15, 1960  F. D. ROBERTS  2,960,191
VEHICLE SKID BRAKES
Filed June 26, 1956  4 Sheets-Sheet 3
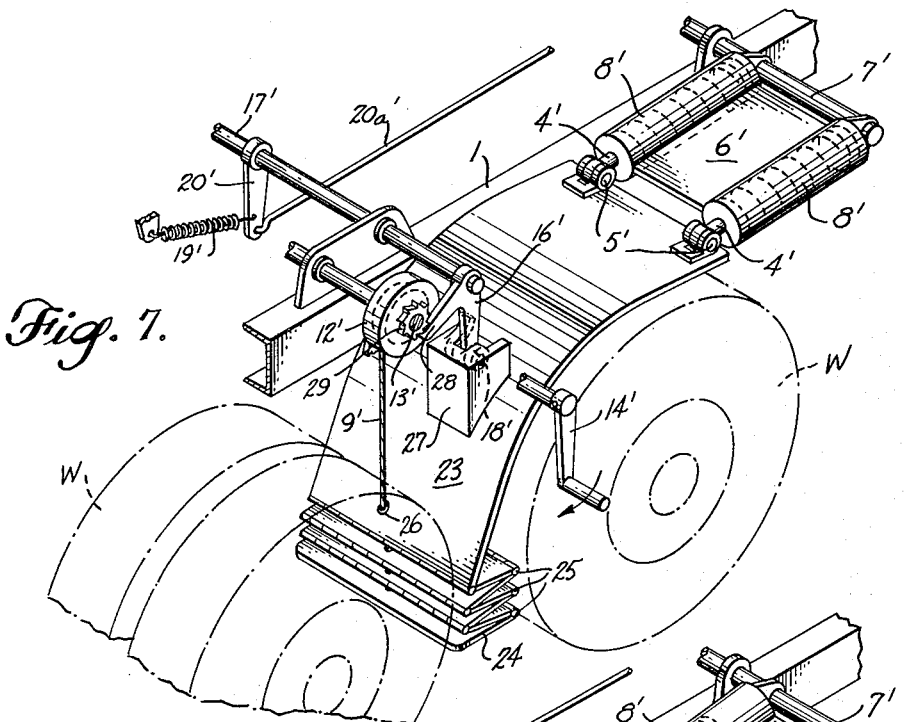
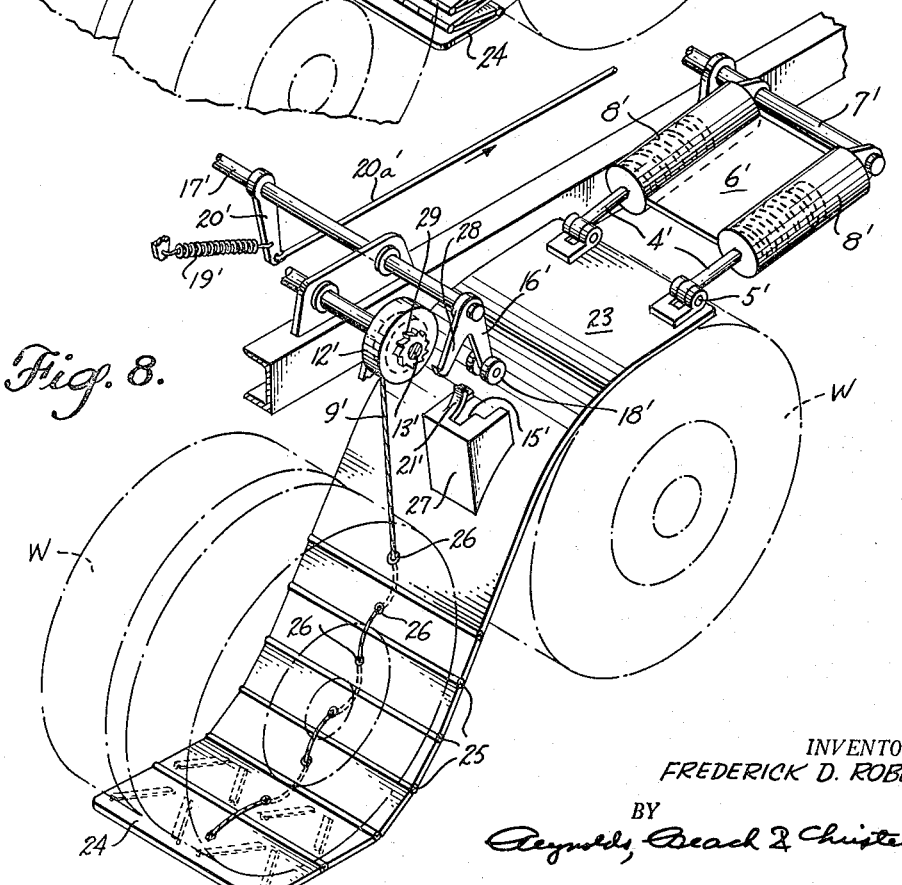
INVENTOR.
FREDERICK D. ROBERTS
BY
Reynolds, Beach & Christensen
ATTORNEYS Nov. 15, 1960

F. D. ROBERTS 2,960,191

VEHICLE SKID BRAKES

Filed June 26, 1956

INVENTOR.
FREDERICK D. ROBERTS
BY
Reynolds, Beach & Christensen
ATTORNEYS

United States Patent Office 2,960,191
Patented Nov. 15, 1960

2,960,191

VEHICLE SKID BRAKES

Frederick David Roberts, P.O. Box 392, Poulsbo, Wash.

Filed June 26, 1956, Ser. No. 593,862

5 Claims. (Cl. 188—4)

The present invention relates to skid brake apparatus for automotive vehicles and is particularly useful for heavy vehicles such as trucks and busses. This application is a continuation in part of my earlier application Serial No. 474,818, filed December 13, 1954, for a Truck Emergency Brake, which is abandoned. While such a skid brake is intended principally for emergency use on failure of the conventional vehicle brakes, it can be used for slowing such a vehicle on steep grades. An important feature is that the skid brake is not of a character intended to be used only once in case of a dire emergency, but can be used whenever additional braking effect is required.

A principal object of the invention therefore is to provide a vehicle skid brake which is of rugged construction so as to be capable of repeated use in stopping or retarding the movement of a heavy vehicle. The brake is of emergency character to the extent, however, that it cannot be released until the vehicle has come to a complete stop and has been reversed to some extent. More particularly it is an object to provide such a brake which will withstand being subjected repeatedly to the shock of a vehicle wheel riding on it at the initiation of the skid brake operation.

Another object is to provide such a vehicle skid brake structure which can be mounted compactly on a vehicle in a position for quick engagement by a wheel of the vehicle at will. In this connection it is an object to provide skid brakes for corresponding wheels on opposite sides of the vehicle, which are coordinated so that the brake members at opposite sides of the vehicle will be engaged simultaneously by both wheels.

A further object is to provide skid brake mounting mechanism and skid brake structure which will insure that each brake shoe engages squarely under its cooperating wheel so that the drag forces will be balanced on the mounting mechanism and consequently will not produce concentrated stress on one particular part of such mounting mechanism. The shock load on the skid brake mounting mechanism is also reduced by providing a shock absorbing connection between each skid brake unit and its mounting structure, which will cushion the initial shock produced by a wheel rolling upon a skid shoe.

An important object of the invention is to provide the skid unit which not only is connected securely to the vehicle frame but which is mounted so that the skid shoe can be retracted easily into inoperative position ready for future braking use. This object is particularly important in an emergency skid type of brake for heavy vehicles, because such units ordinarily are mounted in positions on the vehicle not easily accessible and are heavy if they are to be constructed sufficiently ruggedly to be capable of repeated use in braking a heavy vehicle. When the skid units have reached fully retracted position, it is also an object to latch them in such position automatically so that they will be maintained in inoperative position until the skid brake apparatus is to be used again.

It is also an object to provide skid brake mechanism having the advantages discussed above, which nevertheless is of comparatively simple construction.

Another object is to provide such skid brake mechanism which can be used on roads of any type and whether flat, highly-crowned or rutted. Moreover, an effected drag force can be provided on all types of road surfaces even though they may be covered with snow or ice.

An additional object is to provide skid brake mechanism which is particularly effective on twin axle vehicles.

The foregoing objects can be accomplished by skid brake apparatus incorporating two skid units mounted on a common cross shaft at opposite sides of the vehicle respectively for engagement with corresponding wheels at opposite sides of the vehicle. The skid shoe of each units is composed of articulated plates connected by hinges of considerable extent transversely of the vehicle so as to prevent relative skewing of the plate forming the skid shoes. The skid shoes in turn are mounted by structure connected to locations spaced a substantial distance transversely of the vehicle so that the articulated skid shoe as a whole will be held squarely relative to the wheel and cannot become skewed. The mounting structure for the skid shoes includes shock-absorbing mechanism and may be twin parallel shock-absorbing rods spaced a substantial distance transversely of the vehicle, so that each skid unit will be drag-balanced instead of the drag force being transmitted through a single central member which does not afford control over the attitude of the skid shoe relative to the wheel. The shock absorbing rods are maintained in parallelism by a mounting plate rigidly connecting their shock absorbing units, and in turn having an edge extending longitudinally of the cross shaft and secured to such shaft. The skid shoe can be raised into an operative position by a retracting line connected between the vehicle frame and the drag shoe which will apply a retracting force to the drag shoe operable automatically to lift it and swing its mounting structure into inoperative position. The drag unit is held in such position by a spring-pressed latch which is engaged automatically with the skid unit to hold it in its inoperative retracted position when it reaches such position. Each skid shoe preferably has on its under surface ribs converging forwardly at an acute angle to increase the traction of the skid unit and deter its skewing, particularly on an icy road. Skid apparatus incorporating these features is shown in preferred forms in the accompanying drawings.

Figure 1 is a top perspective view of one type of skid braking apparatus with parts broken away and showing the skid unit in retracted position. Figure 2 is a top perspective view similar to Figure 1, but showing the skid unit in operative position.

Figure 3 is a bottom perspective view of a portion of a skid shoe showing its traction surface.

Figure 7 is a top perspective view of a different type of skid unit showing the parts thereof in inoperative position, and Figure 8 is a similar view showing the parts of the unit in lowered operative position.

Figure 9:
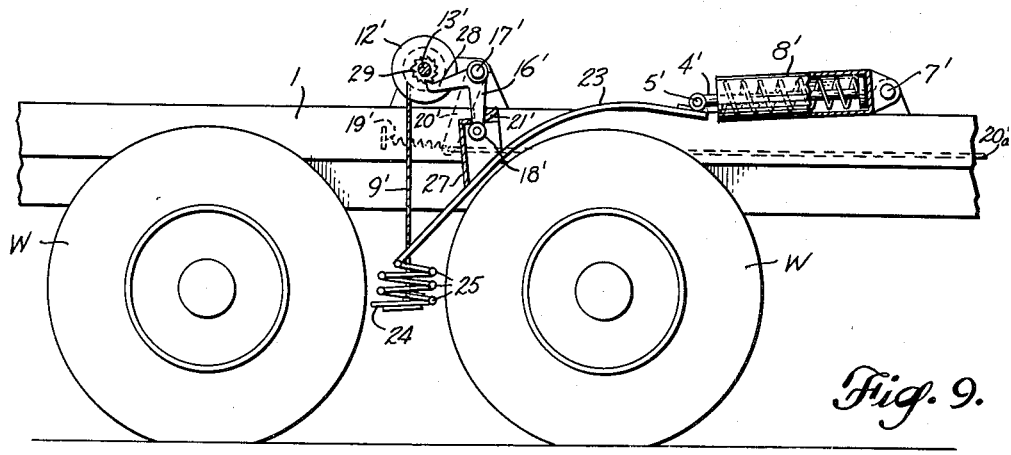
Figure 10:
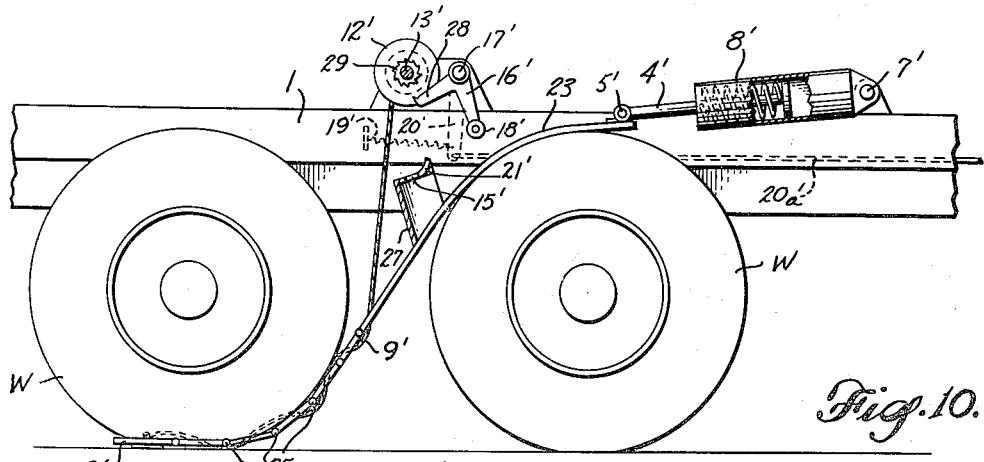
Figure 11:
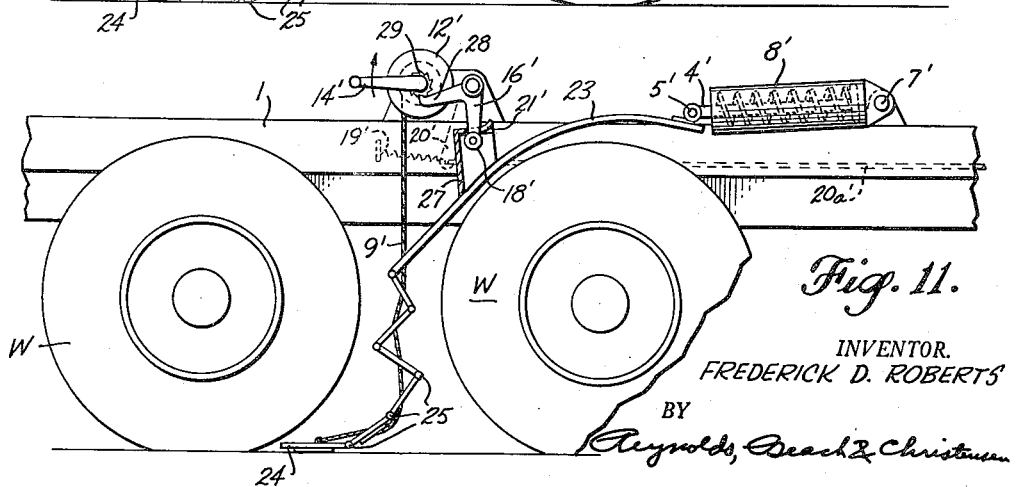

Figure 9 is a side elevation view of the skid unit shown in Figures 7 and 8 with the parts in inoperative position and with parts broken away. Figure 10 is a similar view with parts of the unit in extended operative position, parts being broken away. Figure 11 is a similar view showing the parts in an intermediate position during retraction.

In stopping a heavy vehicle a brake of the skid type is subjected to heavy loads even under the most ideal conditions. If the brake mechanism is not arranged so that the loads are imposed on it in an evenly distributed manner, the stress in the brake mechanism is drastically increased. For that reason brakes of the skid type have not been considered to be very practical for stopping heavy vehicles in the past, because of the extremely rugged and heavy type of construction which would be required for such brake mechanism to withstand any type of load to which it might be subjected. The present invention has made a skid type of brake practical for use on heavy vehicles by controlling and guiding the parts so that the wheel load is always imposed squarely in each skid shoe, and such load is imposed simultaneously on skid shoes at opposite sides of the vehicle, so that it will not tend to swerve.

The skid brake mechanism of the type shown in Figures 1 to 6, inclusive, is suitable for use on vehicles having either a single rear axle or twin rear axles, whereas the type of mechanism shown in Figures 7 to 11, inclusive, is intended to be used only on vehicles having twin rear axles. In both cases the brake unit at only one side of the vehicle is shown, but it will be understood that the skid brake mechanism is duplicated at the opposite side of the vehicle, as illustrated in Figure 1 of my copending application Serial No. 474,818, filed December 13, 1954, for a Truck Emergency Brake. Also because the brake mechanism of the present invention can be used on vehicles of different types, only a representative portion of the vehicle frame is shown in each instance, and it will be appreciated that the particular type of frame construction does not constitute a part of the present invention.

Figure 4:
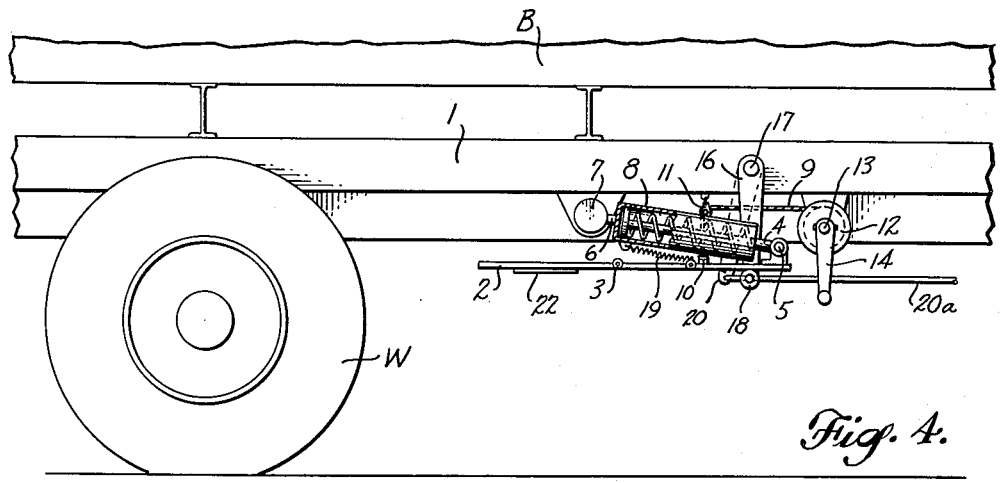
Figure 4 is a side elevation view of a skid brake unit showing the shoe retracted in inoperative position.
Figure 5:
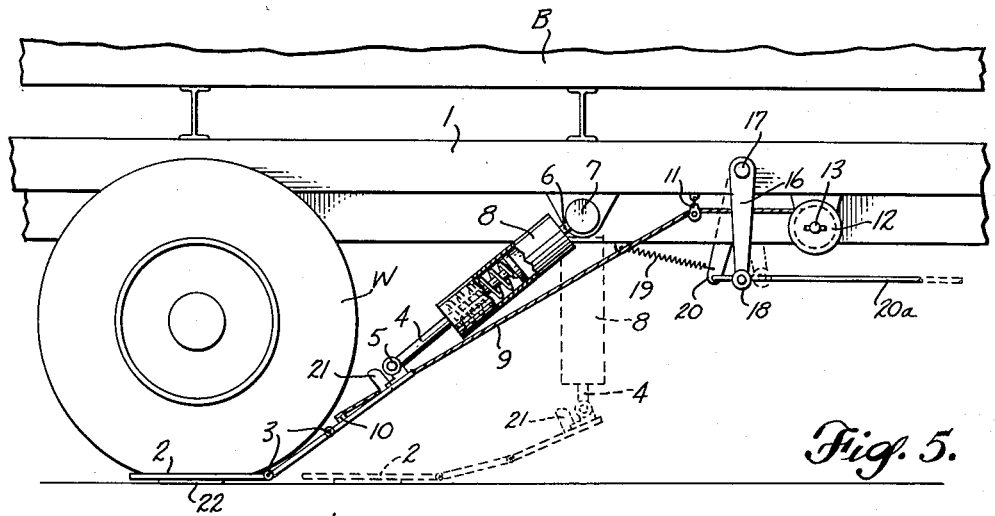
Figure 5 is a similar side elevation view showing the skid unit in lowered operative position.

In Figures 1, 2 and 4 to 6 a side frame member 1 of a vehicle frame is illustrated on which the body B indicated in Figures 4 and 5 can be mounted. The wheels W support such frame in conventional fashion and consequently are shown largely diagrammatically and are drawn in phantom in Figures 1, 2 and 3. Each of the skid brake units at opposite sides of the vehicle includes a skid shoe 2 which is movable between the raised substantially horizontal inoperative position just forward of a wheel, as shown in Figures 1 and 4, and an operative position interengaged between the wheel and the ground, as shown in Figures 2 and 5.

Preferably the skid shoe incorporates a plurality of articulated plates, three being shown in the drawings. These plates are connected by the hinges 3 in edge-to-edge relationship, and, as shown best in Figure 2, the hinges connect portions of the plate edges spaced apart widely, transversely of the vehicle, so as to provide a drag-balanced shoe. The drag exerted by the wheel W on the rearmost plate section of the shoe will be transmitted evenly to the adjacent plate unit across its edge and in turn to the most forward plate unit uniformly across its edge, so that there will be no appreciable tendency for one plate element to become cocked relative to another plate element.

Moreover, the entire shoe will be supported so that it will be guided for movement directly fore and aft to be presented squarely to the wheel in line with the direction of vehicle travel. The mounting mechanism for the shoe is connected to its forward edge at locations spaced widely transversely of the direction of vehicle travel, and such mounting mechanism preferably includes twin parallel rods 4 which are spaced apart transversely of the vehicle and connected to the shoe by pivots 5, as shown best in Figure 2. Such rods are carried by the mounting plate 6, the edge of which remote from the shoe 2 extends longitudinally of and is secured to the cross shaft 7 common to the skid units at opposite sides of the vehicle. Preferably such plate edge is welded directly to the side of the cross shaft, as shown best in Figure 2.

In order to cushion the initial shock of engagement of a wheel with the shoe 2, each of the rods 4 has a shock-absorbing connection with the mounting plate 6. Thus, each rod may constitute a shock absorber plunger reciprocable within a shock-absorbing cylinder 8. Such cylinders may contain any suitable shock-absorbing mechanism, but preferably contain stiff springs engaged by a plunger head, as indicated in broken lines in Figures 1 and 2, portions of these cylinders being broken away in Figures 4 and 5. Alternatively, the shock absorbers may be of the pneumatic or oleo-pneumatic type. In any case the cylinders are rigidly secured to the plate 6 in spaced, parallel relationship, and may, for example, be welded to the opposite plate edges.

In absorbing the initial shock of wheel engagement with the skid shoe each rod 4 may be pulled outwardly by the force on the skid shoe from the broken-line position to the full-line position shown in Figure 5. Suitable stop mechanism interengaged between the shock absorber rods and cylinders may be provided to limit outward movement of the rods, but the movement should be the same for both shock absorbers so that the shoe will always be maintained with its edges and hinge axes exactly perpendicular to the direction of movement of the vehicle and parallel to the axle of wheel W. The shoe will always be engaged squarely by the wheel, therefore, to distribute the load substantially equally to the two shock-absorbing rods 4 and shock absorbers 8.

It is preferred that in inoperative position the skid shoe 2 be retracted upward into a substantially horizontal position just forward of the wheel, as shown in Figure 1. From such a position the shoe can drop quickly through the broken-line position shown in Figure 5 into wheel-engaging operative position. When in such retracted inoperative position the mounting plate 6, shock absorbers 8 and rods 4 are folded closely above and substantially parallel to the skid shoe, as shown in Figures 1 and 4. The parts of the skid unit are guided into this position partly by rotation of shaft 7 and partly by the retracting mechanism, and when the unit has thus been folded in its inoperative position latch mechanism may engage automatically with the unit to hold the parts in such inoperative position.

The retracting mechanism for the skid shoe can be operated very quickly and easily. Such mechanism includes the line 9 which may be a small cable having one end attached to the skid shoe by a lug 10. This lug, as shown best in Figure 2, may be on the upper side and inner edge portion of the forward plate section of the shoe. The hinges 3 preferably are of a type which will enable the plate sections of the skid shoe to be swung about hinges 3 in only one direction from coplanar relationship. This direction is such as to enable the rearward plate section to be swung relative to the next forward plate section, in being engaged beneath a wheel W, as shown in Figures 2 and 5, but neither the rearward plate section nor the intermediate plate section will swing downward or droop relative to the forward plate section of the shoe when it is raised in generally horizontal position.

From the lug 10 the line 9 passes upwardly and forwardly through a pulley 11 mounted on the vehicle frame at a location substantially directly above the position occupied by the lug 10, when the parts of the skid unit are in the raised, inoperative position shown in Figure 1 and Figure 4. From the pulley 11 the line extends to a drum or reel 12 mounted on a shaft 13, which is supported by frame 1 preferably a short distance ahead of the retracted position of a skid unit. The line 9 can be wound upon the reel 12 by rotating the shaft 13, which conveniently can be turned by a crank handle 14 secured to such shaft.

To retract the skid unit into its inoperative position from the operative position shown in Figures 2 and 5, the vehicle first must be allowed to come to a stop. The vehicle is then placed in reverse and the wheels W are rolled off the skid shoe 2. The shock absorbers 8 will draw the released shoes somewhat forwardly and upwardly substantially to the broken-line position shown in Figure 5. The parts will occupy these positions partly because the skid shoe supporting mechanism will not tend to slide the shoe rearwardly along the ground appreciably as the vehicle moves backward and gravity will tend to swing the shock absorbers 8 and their mounting plate 6 into vertical position. The shock absorber springs will then lift rods 4 substantially into the broken-line position of Figure 5.

If the handle 14 is now turned to rotate shaft 13 and wind line 9 onto the drum 12, the tension in such line simultaneously will draw the forward plate of the shoe 2 forward toward the pulley 11 and upward. As the lug 2 approaches its uppermost position, the rearward portion of the shoe will be swung upward about rod pivots 5 in moving the plate toward horizontal position. At the same time, of course, both the shoe 2 and its mounting plate 6 and shock absorbers 8 will be swung upward and forward from the broken-line position of Figure 5, thereby effecting rotation of cross shaft 7. Such rotation of the cross shaft coordinates the retracting movement of the skid brake units at opposite sides of the vehicle. When the skid shoes and their mounting plates and rods have been moved fully into inoperative position, the mounting plate and shoe should be folded into substantially parallel, horizontal relationship, as shown in Figures 1 and 4.

While it would be possible to maintain the skid units in such folded retracted position by in some manner anchoring the lines 9, it is preferred that latch mechanism entirely separate from the retracting mechanism be provided which will hold the skid units thus retracted. Also, it is desirable that such latch mechanism be engageable with the skid units automatically as they are moved into inoperative position by the retracting mechanism. The skid units can then be released to drop by gravity toward operative position simply by releasing the latch mechanism.

A latch engaging notch 15 is provided in the forward end of the skid shoe to receive a latch finger 16 mounted on cross rod 17 extending transversely across the vehicle from one skid unit to the other. The latch finger depends from the cross rod and its lower end carries rollers 18 engageable beneath the skid shoe with the portions of its lower surface alongside the notch 15. To the rod 17 is secured an arm 20. A spring 19 having one end attached to such arm resiliently urges such arm and rod 17 to turn in a direction which will press the lower ends of latch fingers 16 rearwardly toward and into the skid shoe notches 15. A latch-releasing member 20a is also connected to the arm 20, which may be pulled to overcome the tension of spring 19 and turn arm 20 and rod 17 in the opposite direction to swing the latch finger 16 out of the skid shoe notch 15.

Figure 6:
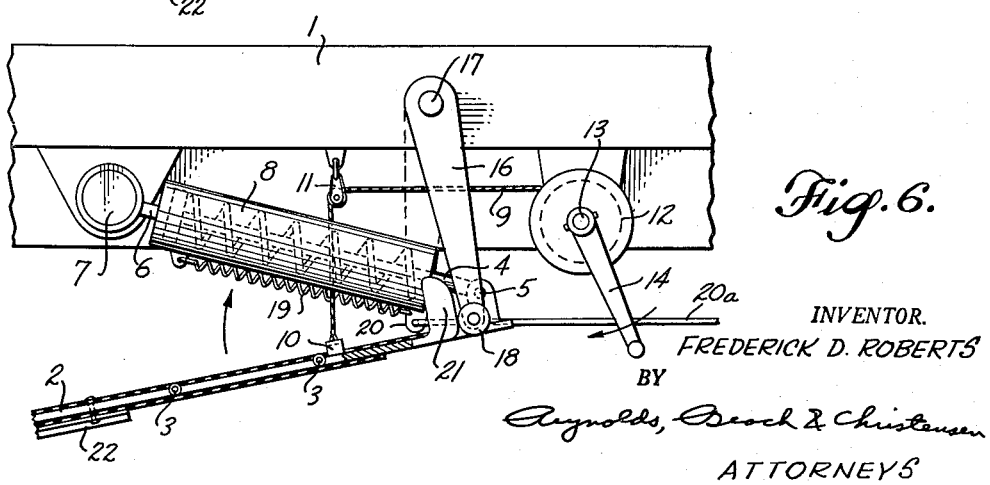
Figure 6 is a longitudinal sectional view through the skid unit on an enlarged scale, showing the skid shoe being moved toward and approaching its fully retracted inoperative position.

Mounted on the skid shoe 2 alongside its latch finger receiving notch 15 is a lug 21 shown best in Figure 6. As the skid unit is swung upward toward inoperative position by the retracting mechanism described, the lug 21 will engage the roller 18 on one side of the latch finger 16 and swing the lower end of the latch finger forwardly as upward movement of the folded skid unit continues. When the skid unit has been raised far enough, the roller will ride beneath the lug 21 and the skid plate, so that the spring 19 by turning arm 20 and rod 17 will draw the latch finger back into the notch 15. If the upward force exerted by the skid unit lifting line 19 is then relieved, the weight of the skid unit will be borne by the latch finger 16 through the engagement of its rollers 18 with the underside of the skid shoe alongside the notch 15. The skid unit will thus be supported in its inoperative position until the latch is released.

When the latch-releasing member 20a is pulled to the right, as seen in Figures 1 and 2, into the broken-line position of Figure 5, the wider portion of notch 15 will clear the rollers 18 so that the skid units on both sides of the vehicle will drop simultaneously into the broken-line position shown in Figure 5. As forward movement of the vehicle continues, therefore, the wheel W will roll onto the skid shoe, as shown in solid lines in Figure 5 and in Figure 2. The drag thus produced on the skid shoe will be resisted initially by the shock absorbers 8 as rods 4 are drawn rearward until the wheel has run fully onto the skid shoe. Thereupon the braking force effected by the drag of the skid shoes will be produced on the vehicle. Because of the rigidity of mounting plate 6 and the attachment of its edge to cross shaft 7, it will be evident that the skid shoe 2 will be presented squarely to the wheel. Also because of the balanced connection of rods 4 at spaced locations between the mounting plate 6 and the skid shoe, such shoe will not skew as it engages the ground, even if its contact with the ground should be somewhat uneven. Moreover, the connections between the plates of the skid shoe effected by the hinges connecting widely spaced portions of the plate edges will prevent any skewing of one shoe plate section relative to another. Because of this construction and relationship of the skid unit parts, all the drag forces will be transmitted in a distributed and balanced fashion to the cross shaft 7, thereby subjecting the parts of the skid unit to the minimum possible stress for a given braking effort.

The skid shoe 2 can be made of any highly wear-resistant, strong material. The shoe plate sections may, for example, be made of steel reinforcement surfaced with rubber, at least on its bottom surface and preferably on both surfaces. For some uses it may be desirable to increase the drag force over that which would be produced by the engagement of a flat face with the road surface. Particularly for use on slippery surfaces such as an ice-coated road, an increase in the drag produced by the shoe is desirable. It is important, however, that roughening of the road-engaging shoe face be of a character which will not produce any appreciable force tending to swing the shoe sidewise. A satisfactory gripping structure is shown in Figure 3 as including ribs 22 converging forwardly at an acute angle which produce a plowing action. As shown, these ribs are spaced apart transversely of the vehicle throughout their lengths. Several pairs of these ribs may be provided as shown.

The type of skid brake mechanism described in connection with Figures 1 to 6, inclusive, is applicable to vehicles having any number of rear axles, and for vehicles having more than one rear axle the brake mechanism would be mounted slightly forward of the foremost axle. The type of skid brake mechanism shown in Figures 7 to 11 is particularly adapted for use on vehicles having at least two rear axles. In this instance the skid shoe engages beneath the wheel second from the front one of the rear wheels, and also engages with the front one of the rear wheels, but with an upper portion of it rather than beneath it.

The modified skid units of the type shown in Figures 7 to 11 are connected respectively to opposite ends of a cross shaft 7' extending transversely across the vehicle and mounted on the vehicle frame 1. Each skid unit is secured to this shaft in balanced fashion by the plate 6' and shock absorbers 8'. As in the construction described in connection with Figures 1 to 6, inclusive, an edge of plate 6' can be welded directly to the cross shaft 7' and the cylinders 8' of the shock absorbers welded to opposite longitudinal edges of the plate 6'. Alternatively, in either type of construction the shock-absorbing cylinders 8' can be connected directly to the cross shaft 7' and the mounting plate 6' only to the shock-absorbing members, or, additionally, to the cross shaft is desired. The important feature is that the mounting plate and shock-absorbing cylinders constitute an integral mounting element constructed so that the cylinders will be maintained in definitely spaced parallel relationship and will be anchored adequately to the cross shaft.

In each of the shock-absorbing cylinders 8' is received a connecting rod 4', which rods are connected respectively to opposite sides of the forward end of the skid shoe so as to hold the shoe squarely in alignment with the wheels and prevent it from skewing in the event that it is subjected to an unbalanced load for any reason. The connection between the rods 4' and the skid shoe is effected by the pivots 5'. As in the previous type of brake mechanism described, the cross shaft 7' is mounted slightly ahead of the most forward rear axle.

The principal difference of the skid brake mechanism shown in Figures 7 to 11, inclusive, over that shown in Figures 1 to 6, inclusive, is in the construction, arrangement and proportions of the brake skid shoe. In the apparatus of Figures 7 to 11, inclusive, the skid shoe is composed of two principal components, namely a single long, arcuate, forward plate 23 extending from the connecting rods 4' to a location generally centrally between the foremost rear axle and the next rearward rear axle and a rearward component composed of articulated plate sections 24 arranged to extend beneath a wheel mounted on the rear axle next rearwardly of the front rear axle. These plate sections 24 are connected together by hinges 25 joining adjacent edges of adjacent plate sections, and such hinges join portions of such edges widely spaced transversely of the vehicle to effect a stable load-distributing connection between the various plate sections 24.

The number of plate sections 24 constituting the rearward component of the skid shoe is not critical, six being shown in the drawings. The important consideration is that these plate sections be of a fore-and-aft width small enough so that they can be received substantially horizontally in the space between adjacent truck wheels, when in raised inoperative position, as illustrated in Figures 7 and 9. The hinges 25 are of a type enabling the plate sections to be folded in accordion fashion as shown. The aggregate length of the plate sections 24 fore and aft of the vehicle must be sufficient to enable the trailing portion of such rearward shoe section to be engaged beneath the second rear wheels, as shown in Figures 8 and 10. Whether in such braking position or in the inoperative position of Figures 7 and 9, or in any intermediate position such as shown in Figure 11, the hinges 25 will prevent skewing of any skid shoe section relative to another section.

The same general type of retracting mechanism as described in connection with the apparatus shown in Figures 1 to 6 is used for the apparatus of Figures 7 to 11. Such retracting mechanism includes a line 9' having one end secured to the shoe and capable of being wound on a drum or reel 12' mounted on a cross rod 13' which can be turned by rotation of a crank 14'. In this instance the line 9' is led through apertures 26 in the plate sections 24 of the shoe, which apertures are arranged so that they will be substantially combined when the plate sections are folded in the inoperative position shown in Figures 7 and 9. The line 9' is woven in and out of such apertures in adjacent plate sections, as shown in Figures 8 and 10, and the end of such line is secured to the rearmost plate section.

After the vehicle has been brought to a stop, its wheels can be driven in reverse to roll the rearward wheels off the skid shoe sections 24 on which they rest as shown in Figures 8 and 10. The ground-engaging portion of the skid shoe will not move rearwardly with the vehicle, but the rearward portion of the skid shoe formed by the articulated plates 24 will be somewhat collapsed, as shown in Figure 11. Moreover, as soon as the rearward force on the shoe is relieved by rearward motion of the vehicle, the spring type shock absorbers 8' will draw forward the forward section 23 of the skid shoe. On the upper surface of this forward shoe section is mounted a latch box 27 opening forwardly and having a latch-receiving notch 15' in its upper end. Alongside this notch is a lug 21' engageable by rollers 18' mounted on the lower end of a latch finger 16'.

The latch finger 16' is mounted on a latching cross rod 17' on the opposite ends of which are mounted the latch fingers for the skid units at opposite sides of the vehicle, respectively. On an intermediate portion of this rod is secured an arm 20' to which is connected a spring 19' urging such arm and the rod to turn in a direction such as to swing the lower end of latch finger 16' rearwardly. To the arm 20' also is connected a latch-releasing member 20a' which may be pulled, as indicated in Figure 8, to turn the arm 20' and the rod 17' oppositely for withdrawing the lower end of the latch finger 16' from the notch 15' of the box 27.

As the shock absorbers 8' draw the rods 4' and the shoe element 23 forward from the position shown in Figure 10 to the position shown in Figure 11, the lug 21' will engage one of the rollers 18' mounted on the latch finger 16' which will wedge the box 27 and consequently the skid shoe unit 23 upwardly. When forward movement of the skid shoe has been completed, the unit 23 will have been raised to the position shown in Figures 7, 9 and 11, and the notch 15' will have been drawn forward over the latch finger 16' so that the rollers 18' are received in the box 27 and engaged between the portions of its upper end along opposite sides of the notch 15'. The latch finger will be held in such position engaged in the notch by the resilient force of spring 19' until the latch is released by pulling on latch releasing member 20a'.

Also mounted on cross rod 17' or latch finger 16' is the dog 28 engageable with the teeth of a ratchet wheel 29 mounted on rod 13'. Normally such dog is held in engagement with the ratchet wheel by the force of spring 19' acting on arm 20' carried by rod 17' so as to restrain rotation of rod 13' in one direction while permitting its rotation in the direction to shorten line 9'. As the crank 14' is turned, therefore, to wind the line 9' on the reel 12', the crank can be released at any time and the dog 28 will hold the ratchet wheel 29 against reverse rotation.

Because of the weaving of line 9' in and out through the apertures 26 of the shoe plate sections 24, tensioning line 9' by winding it on reel 12' when the plate sections 24 are in the positions shown in Figure 11 will further compact the accordion folding relationship of these plate sections. As the winding of line 9' is continued, therefore, the plate sections 24 will be raised off the ground from the position shown in Figure 11 to that of Figure 9. The movement of dog 28 and shaft 17 necessary to allow the teeth of ratchet wheel 29 to escape past the dog 28 will not be sufficient to release the latch finger 16' from the notch 15' of the box 27 on the shoe portion 23. Reeling in of the retracting line 9' can be discontinued when the plate sections 24 have reached a resonably collapsed position such as shown in Figure 9, the engagement of the dog 28 with the ratchet wheel 29 will prevent the force of gravity acting on such plate sections from pulling the line 9' down again off the reel, and the rearward portion of the shoe composed of plate sections 24 will thus be held in retracted, inoperative position.

When it is desired to render effective the skid brake apparatus shown in Figures 7 to 11, inclusive, the latch releasing member 20a' will be pulled to turn rod 17' in a counterclockwise direction, as seen in Figures 7, 9 and 10, in opposition to the force of spring 19'. Such rod rotation simultaneously will withdraw dog 28 from engagement with the ratchet wheel 29 so that the line 9' may pay out freely and swing the latch finger 16' out of the notch 15' in box 27. The line 9' will be unwound from reel 12' as the plate sections 24 drop, and release of the latch 16', 15' will enable the forward portion of the shoe to fall down onto the forward one of the rear vehicle wheels.

As forward movement of the vehicle continues, the rearward wheel of the pair shown in Figures 7 to 11, inclusive, will run upon the rearmost plate or plates 24 of the skid shoe, thus producing a very substantial drag force on the shoe. Such drag force will be transmitted forwardly to the successive plate sections 24 and thence to the forward component 23 of the shoe, and the twin parallel shock absorbing rods 4'. The drag force applied by these rods to the shock absorbers 8' will pull the rods rearwardly by the initial drag shock to cushion it until the shoe reaches the position shown in Figure 10. In that position it will be seen that the rearward wheel rides upon the trailing portion of the rearward component of the shoe, and the lower surface of the forward component 23 is pressed firmly against the periphery of the forward wheel to oppose its rotation. The drag effect of the shoe is therefore double-acting so that the vehicle will be brought to a stop more quickly.

Whichever type of skid brake apparatus is employed, it will be seen that the shoe is attached to the vehicle cross shaft by the mounting plate in a fashion which will prevent skewing of the shoe. Also, in both cases the initial shock of the wheel riding upon the shoe is absorbed by the balanced shock-absorbing mechanism, both to avoid an excessive jolt of the vehicle and to dissipate the instantaneous shock load to which the skid unit structure would otherwise be subjected. As indicated in Figures 8 and 11, the ground-engaging surface of the shoe shown in these figures can be provided with forwardly converging ribs of the type shown in Figures 2 and 3, if it should be desired to increase the effectiveness of the shoe engagement with the road in producing drag. Moreover, because the drag units are coordinated at opposite sides of the vehicle by the cross shaft so that the skid shoes will be engaged simultaneously with the ground, no tendency is produced by the skid brake for the rear of the vehicle to slide sidewise, and any such tendency which may be inherent in braking of the vehicle, such as on a steep slope, would be deterred by the grip on the ground of the convergent ribs on the bottoms of the skid shoes shown in Figures 2, 3 and 8.

I claim as my invention:

1. An emergency brake for vehicles having a chassis and wheels, comprising plate members connected to said chassis in longitudinal alignment with the wheels, brake pads, hinge means connecting adjacent edges of said plate members and said brake pads and guiding said plate members and said brake pads for movement between a folded position adjacent to the chassis and an extended position in which the brake pads engage the ground, the edges of said brake pads adjacent to said hinge means having notches therein, latch arms pivoted to the vehicle chassis and received in such brake pad notches to retain said brake pads and said plate members in folded position, and rollers carried by the lower ends of said latch arms and engaging the lower surfaces of said brake pads adjacent to the edges of their notches when said latch arms are engaged in said notches.

2. An emergency brake for vehicles having a chassis and wheels, comprising plate members connected to said chassis in longitudinal alignment with the wheels, brake pads, hinge means connecting adjacent edges of said plate members and said brake pads and guiding said plate members and said brake pads for movement between a folded position adjacent to the chassis with said plate members and said brake pads in face-to-face relationship and an extended position in which the brake pads engage the ground, such adjacent edges of said plate members and of said brake pads connected by said hinge means having notches therein disposed in registry when said plate members and said brake pads are thus folded, and latch arms carried by the vehicle chassis and received in such registering notches of said plate members and said brake pads for retaining said plate members and said brake pads in folded position.

3. An emergency brake for vehicles having a chassis and wheels, comprising plate members connected to said chassis in longitudinal alignment with the wheels, brake pads, hinge means connecting adjacent edges of said plate members and said brake pads and guiding said plate members and said brake pads for movement between a folded position adjacent to the chassis and an extended position in which the brake pads engage the ground, retracting means operable to move said plate members and said brake pads from such extended position upward into such folded position, the edges of said brake pads adjacent to said hinge means having notches therein, latch arms carried by the vehicle chassis and adapted to be received in such brake pad notches to retain said brake pads and said plate members in such folded position, and latch arm engaging lugs projecting from said plate members and engageable with said latch arms as said plate members and said brake pads are moved by said retracting means toward such folded position to move said latch means out of the path of movement of said plate members.

4. Vehicle skid brake mechanism comprising a mounting plate aligned with a vehicle wheel, shock-absorbing means carried by said mounting plate, means rotatably mounted on the vehicle frame and carrying said mounting plate secured thereto and said shock-absorbing means for bodily rotation relative to the vehicle, a skid shoe having its forward portion pivotally connected to said shock-absorbing means and including a plurality of plate sections at least one of which is engageable with a vehicle wheel, hinge means joining adjacent edges of adjacent plate sections, a retracting line connected to one of said skid shoe plate sections, drum means rotatable to reel in said line for hoisting said shoe into inoperative position and folding said mounting plate and said shoe together, and latch means independent of said retracting line and drum means and engageable with said shoe for retaining it in such inoperative position and releasable to enable said shoe to drop into ground-engaging position for rolling of a vehicle wheel thereon to produce a drag force on the vehicle through said shock-absorbing means.

5. Vehicle skid brake mechanism comprising a mounting plate, pivot means supporting said mounting plate from the vehicle forward of a vehicle wheel, said pivot means being rotatable through an angle greater than a right angle for swinging of said mounting plate from a position depending from said pivot means into a stored position extending substantially horizontally forward from said pivot means, a second plate having an edge hingedly connected to the swinging edge of said mounting plate for swinging from a lowered position upward into a substantially horizontal stored position folded beneath said mounting plate in its stored position, a brake pad, hinge means connecting an edge of said brake pad to the edge of said second plate remote from its edge hingedly connected to said mounting plate, means limiting rotation of said hinge means to prevent swinging of said brake pad downwardly substantially beyond coplanar relationship with said second plate when it is in its stored position but said hinge means guiding said brake pad for swinging upward relative to said second plate when said second plate is in its lowered position, and means connected to said second plate and operable to swing it upward into its stored position.

References Cited in the file of this patent

UNITED STATES PATENTS

| | | |
|---|---|---|
| 1,528,340 | Nagy | Mar. 3, 1925 |
| 2,513,691 | Tower | July 4, 1950 |
| 2,562,521 | Blattner | July 31, 1951 |
| 2,605,860 | Smith | Aug. 5, 1952 |
| 2,718,283 | Ropp | Sept. 20, 1955 |
| 2,730,196 | Besoyon | Jan. 10, 1956 |
| 2,746,570 | Stahmer | May 22, 1956 |

FOREIGN PATENTS

| | | |
|---|---|---|
| 1,100,190 | France | Mar. 30, 1955 |